United States Patent [19]
Jonath

[11] 4,316,517
[45] Feb. 23, 1982

[54] WEIGHING SCALE WITH IMPROVED ZERO CORRECTION

[75] Inventor: Eberhard Jonath, Volketswil, Switzerland

[73] Assignee: Mettler Instrumente AG, Greifensee, Switzerland

[21] Appl. No.: 195,477

[22] Filed: Oct. 9, 1980

[30] Foreign Application Priority Data

Dec. 20, 1979 [CH] Switzerland .................. 11311/79

[51] Int. Cl.³ .................. G01G 19/04; G01G 19/52; G01G 23/10
[52] U.S. Cl. .................................. 177/25; 177/50; 177/185; 177/DIG. 3
[58] Field of Search ............ 177/25, 50, 185, 210 FP, 177/DIG. 3; 364/567, 734

[56] References Cited

U.S. PATENT DOCUMENTS

| | | | |
|---|---|---|---|
| 3,665,169 | 5/1972 | Henderson et al. | 177/25 X |
| 3,786,884 | 1/1974 | Allenspach | 177/210 FP X |
| 3,797,595 | 3/1974 | Yin et al. | 177/DIG. 3 |
| 3,860,802 | 1/1975 | Knothe et al. | 177/DIG. 3 |
| 3,986,012 | 10/1976 | Loshbough et al. | 177/25 X |
| 4,044,846 | 8/1977 | Matilainen | 177/DIG. 3 |
| 4,137,979 | 2/1979 | Itani | 177/DIG. 3 |

Primary Examiner—George H. Miller, Jr.
Attorney, Agent, or Firm—Marianne Rich

[57] ABSTRACT

A stabilization of the zero point of a digital display in a periodically operating weighing scale is accomplished by obtaining the difference between the then-present weight signal S and a stored reference signal, for example the tare value. Resulting differences less than a predetermined threshold value are stored. If the next following difference signal is again smaller than the threshold value and has the same sign, the reference value is corrected by the stored difference. If the signs are different, the tare or reference value remains the same and the value of the stored difference signal is changed to the newly-generated value.

3 Claims, 2 Drawing Figures

WEIGHING SCALE WITH IMPROVED ZERO CORRECTION

Cross reference to related applications and publications:
U.S. Pat. No. 3,986,012
U.S. Pat. No. 3,665,169;
U.S. Pat. No. 3,786,884
U.S. Application Ser. No. 195,332 filed simultaneously herewith, entitled "Improved Automatic Zero Correction Apparatus for Weighing Balances" by the same inventor and assigned to the same assignee; and
U.S. Application Ser. No. 195,331 filed simultaneously herewith; inventor: Walter Kupper; assigned to the same assignee; title "Weighing Balance with Automatic Zero Correction".

The present invention relates to weighing methods and apparatus and, in particular, to scales periodically furnishing digital weight proportional signals. In particular, it relates to scales having automatic zero correction.

BACKGROUND AND PRIOR ART

Automatic zero point correction methods and apparatus are known. In such methods and apparatus, a signal corresponding to a reference weight is stored in a first storage. Subsequent weight-proportional signals are compared to the stored signal, the difference between the new and the stored signal being compared to a predetermined threshold value. The digital display is changed to correspond to the new value only when the difference is at least as big as the threshold value. Differences smaller than the threshold value are utilized for zero correction purposes.

Such a method is described in U.S. Pat. No. 3,665,169. In this method, differences smaller than the threshold value (first differences) cause the new weighing signal to be stored in the first storage, instead of the reference value. Thus, in the case of differences less than the threshold value, the full difference is immediately effective in changing the zero point. This method and apparatus has the disadvantage that transient oscillations in the weighing signal cause a full and generally unnecessary correction.

SUMMARY OF THE INVENTION

It is an object of the present invention to furnish an automatic zero correction which does not have the above disadvantages. In other words, a reliable correction of drift is to take place, while the effect of transient oscillations is to be reduced.

In accordance with the present invention, the sign of a first difference signal generated in a given period is compared to the sign of a first difference signal, if present in the next subsequent period. If the two so-compared signs are the same, the stored signal is corrected by an amount corresponding to the difference signal generated in the first of the two periods. It will be noted that a full correction takes place, but delayed by one measuring period. This is effect constitutes a damping process, since no correction takes place when the sign of the two so-compared first difference signals is not the same. For most practical purposes, this constitutes sufficient discrimination between transient and continuing changes in the zero point, i.e. between oscillations of the zero point and drift thereof.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

FIG. 1 is a block diagram of a scale utilizing the present invention; and
FIG. 2 is a flow chart for a microprocessor incorporating the present invention.

DESCRIPTION OF THE PREFERRED EMBODIMENT

Figure 1:
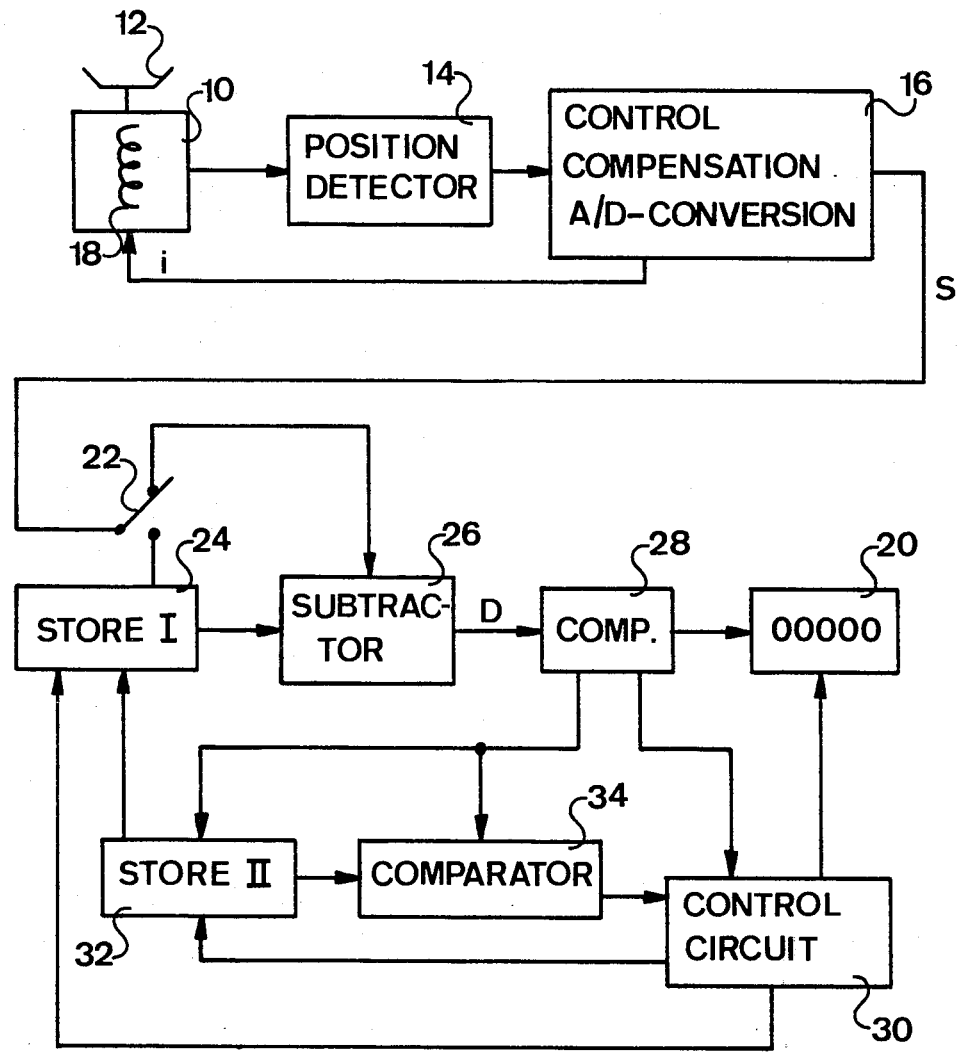

As shown in FIG. 1, a scale 10 has a load receiver, namely a pan 12. Pan 12 moves in accordance with the applied load. The position of the pan is sensed by a sensor 14 which furnishes a voltage corresponding to the so-sensed position. This voltage u is connected to a control and compensation circuit 16 which furnishes a load proportional current i. Current i is applied to a compensation coil 18 which is rigidly connected to pan 12. The compensation coil is arranged in the air gap of a permanent magnet system. The electromagnetic force exerted by coil current i causes the pan to return to an equilibrium position. A digital signal S is also generated in circuit 16. Digital signal S has a value corresponding to load proportional current i and is applied to a digital display 20.

For scales having a relatively high resolution, the signal S includes at least one place more than is visible in digital display 20.

A tare circuit is provided for taking into account the weight of the container holding the substance to be weighed and/or any dead weight the value of which is not to be displayed. The tare circuit includes a tare switch 22. Activation of tare switch 22 causes the digital signal S to be stored in a first storage (store I) having reference numeral 24. In subsequent measuring periods, the newly generated signal S is subtracted from the so-stored value in a subtraction circuit 26. The difference signal generated at the output of subtraction circuit 26 is denoted by D in FIG. 1. Whenever the newly furnished weight signal S is equal to the stored signal, (e.g. if none of the substance to be weighed has as yet been added into the container on pan 12) the signal D becomes zero. This value is then displayed on display 20. When the substance to be weighed is then applied, the difference signal D corresponds to the net weight which is displayed in display 20.

This is the operation of the known scale described in U.S. Pat. No. 3,786,884. No further details of its operation need be given here since it is described herein only to illustrate the incorporation of the present invention into an existing system.

In accordance with the present invention, this known scale is now modified as follows to correct for any possible zero point drift. A comparator 28 is provided for comparing the difference signal (herein referred to as the main difference signal) to a fixed threshold value Sw. This threshold value may, for example, correspond to one unit in the last place displayed on display 20. If the difference D is larger than the threshold value, the assumption exists that a true change in weight is taking place. A control circuit 30, in response to a second difference signal, i.e. a difference signal indicative of a value of D exceeding the threshold value, allows the difference signal D to be displayed on display 20. If the difference D is less than the threshold value, a first difference signal is generated by comparator 28. This first difference signal is not applied to control circuit 30. Under these conditions, the display remains unchanged.

When the difference D is smaller than the threshold value, a first difference signal corresponding to the value of signal D is stored in store II having reference numeral 32. The next time a first difference signal showing that the difference D is less than the threshold value is generated, a test is first carried out to see if the value stored in store II is zero. If so, the newly furnished first difference signal D' is stored in store II. If the contents of store II are not zero, a sign comparator 34 compares the sign of the newly furnished first difference signal to the sign of the signal in store II. If the two signs are the same, the value in store I is corrected by the value in store II, the sign of the value of store II being taken into consideration. If the signs compared in comparator 34 are different, the value stored in store I remains the same. The value in store II is changed to the value of the newly furnished first difference signal.

For any change in weight on the scale for which signal D is greater or equal to the threshold value Sw, the contents of store II are erased, that is store II is reset to zero. This prevents old difference values from being used to correct the reference value in store I.

The above-described steps are repeated for each measuring period in which a difference D having a value less than the threshold value Sw is generated. For scales of high resolution, they will thus take place in most measuring periods. There may be cases in which it is expected that the difference D will occasionally or possibly even frequently, be a zero difference. Under these conditions, it is desirably to reset store II to zero for each difference D equal to zero, for the above-mentioned reason.

Changes in the zero point due to drift, that is continuing changes in one direction, are thus reliably recognized and are corrected sufficiently rapidly, while the effects of temporary deviations with changing signs are diminished.

Figure 2:
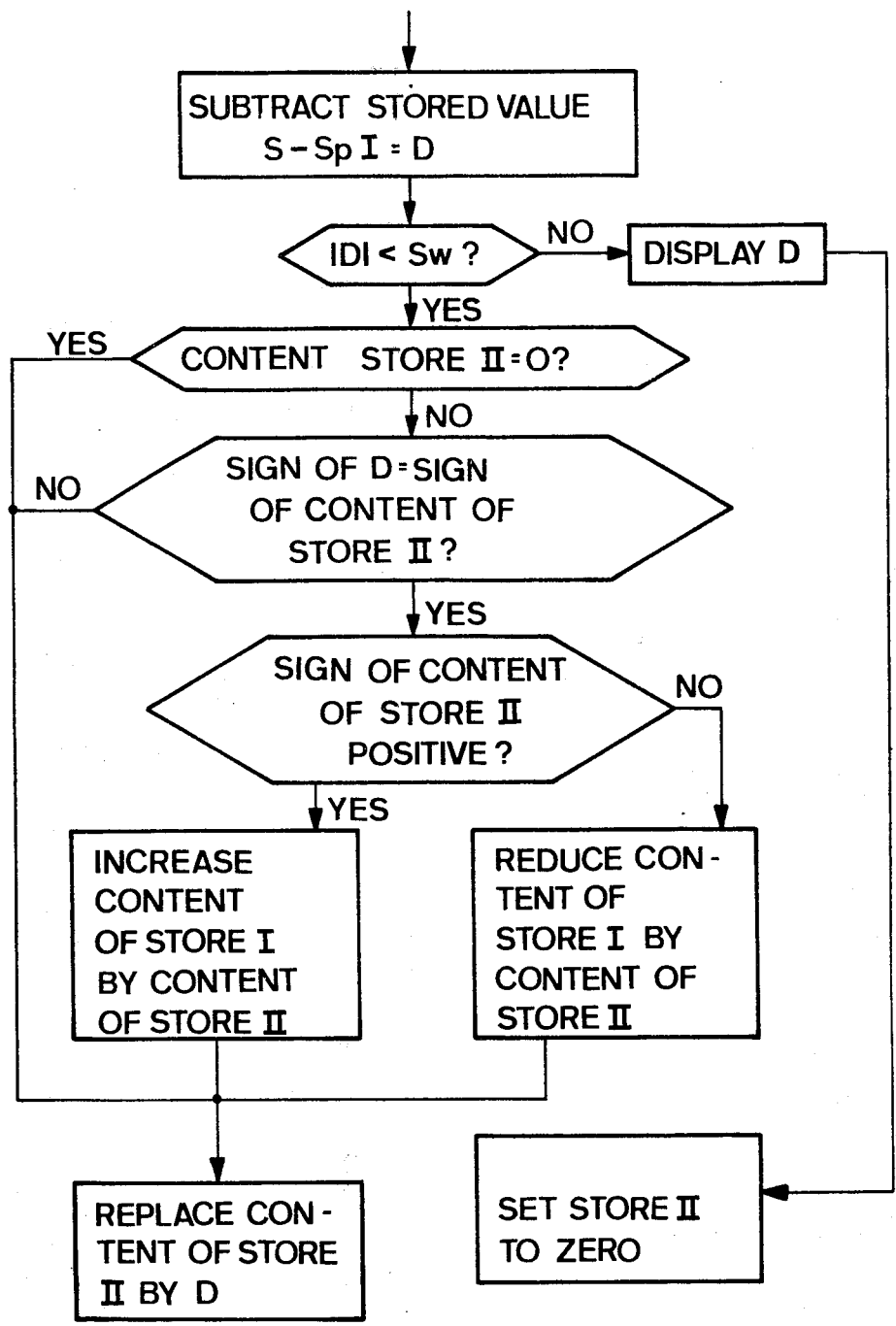

As shown in FIG. 1, the above-described method and apparatus is incorporated in circuitry having discrete components of the conventional type. However, a presently preferred embodiment utilizes a microcomputer which is a standard microcomputer utilizing a central processing unit, a read-only memory and a random access memory. A flow chart for such a microcomputer is shown in FIG. 2. Since the steps shown therein directly correspond to the method of operation of the circuit of FIG. 1 as described above, no further discussion seems required.

It should further be noted that the invention is by no means limited to scales having electromagnetic compensation. It is applicable for all scales in which digital weight signals are periodically generated. This, for example, would include scales having strain gauges as sensors, scales with transversely oscillating strings, etc.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. In a weighing method comprising the steps of periodically generating digital weight proportional signals, comparing said weight proportional signals to a reference signal and generating main difference signals corresponding to the difference therebetween, comparing said main difference signals to a predetermined threshold signal and furnishing a first or a second difference signal when said main difference signal is, respectively, less than or at least equal said threshold signal, and displaying said second difference signal, the improvement comprising the steps of when a first difference signal is generated: storing said first difference signal thereby creating a stored difference signal;

comparing the sign of a first difference signal generated in a subsequent measuring to the sign of said stored difference signal and furnishing a comparator output signal only when the so compared signs are the same; and changing said reference signal by a value corresponding to said stored difference signal only in response to said comparator output signal.

2. A method as set forth in claim 1, wherein said reference signal is changed by a value equal to said stored difference signal when said so compared signs are the same.

3. In a weighing scale having means for periodically generating digital weight proportional signals, means for comparing said weight proportional signals to a reference signal and generating main difference signals corresponding to the difference therebetween, means for comparing said main difference signal to a predetermined threshold signal and furnishing a first or a second difference signal when said main difference signal is, respectively, less than or at least equal to said threshold signal, display means, and means for applying only said second difference signal to said display means, the improvement comprising means for storing a first difference signal thereby creating a stored difference signal;

means for comparing the sign of the next subsequently generated first difference signal to the sign of said stored difference signal and furnishing a comparator output signal only when the so-compared signs are the same;

control circuit means for correcting said reference signal by a value corresponding to said stored difference signal only in response to said comparator output signal.

* * * * *